Aug. 29, 1933.  J. P. SKILLEN  1,924,331
CONTROL SYSTEM FOR DYNAMO ELECTRIC MACHINES
Filed Nov. 11, 1931
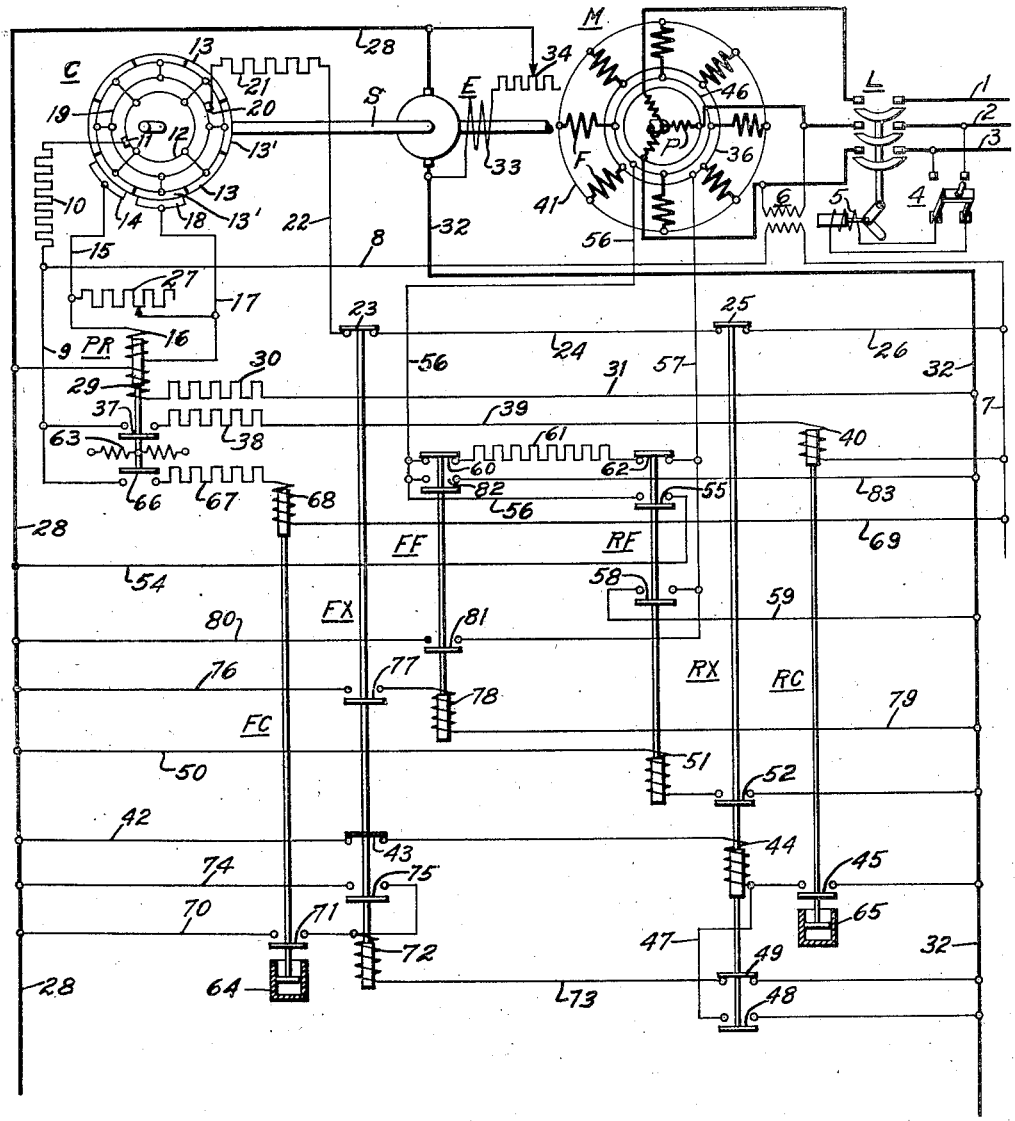
WITNESSES:
INVENTOR
Jesse P. Skillen
BY
ATTORNEY Patented Aug. 29, 1933

1,924,331

UNITED STATES PATENT OFFICE 1,924,331

CONTROL SYSTEM FOR DYNAMO-ELECTRIC MACHINES

Jesse P. Skillen, Hamilton, Ontario, Canada, assignor to Westinghouse Electric & Manufacturing Company, a corporation of Pennsylvania Application November 11, 1931
Serial No. 574,238

11 Claims. (Cl. 171—118)

This invention pertains to a system for automatically starting alternating-current motors and is especially adapted for use in starting motor-generator sets in automatically or semi-automatically operated substations.

The control system embodies means responsive to the percentage of slip of an alternating-current motor and is thus of special value for starting synchronous motors, although the control system may be easily adapted for use with induction motors.

One object of my invention is to provide for exciting the field windings of a synchronous motor when the motor has attained substantially synchronous speed.

A more general object is to effectively and efficiently control the operation and particularly the starting operation of synchronous condensers, synchronous generators, or water wheel generators, synchronous converters and motor generator sets.

Another object of my invention is to control the transfer of the motor from starting to running connections in response to changes in percentage of slip of the motor.

A further object of my invention is to control the excitation and polarity of the motor in response to the amount of slip.

It is also an object of my invention to synchronize a synchronous dynamo-electric machine by exciting the pole pieces with the correct polarity to prevent slipping over a pole piece and the consequent lined disturbance and hunting of the armature that may result therefrom.

Other objects and advantages will become more apparent from a study of the following specification, when taken in conjunction with the accompanying drawing, in which:

The single figure is a diagrammatic view of the complete circuit of the control system embodying my invention.

Referring more particularly to the drawing, the reference characters 1, 2 and 3 designate the supply conductors of a three-phase source of supply leading to a suitable generator, not shown. A line contactor L is disposed to connect the supply conductors to the synchronous motor M having the primary or armature windings P and the secondary or field windings F. An exciter E and a slip-ring commutator device or synchronizing device C are coupled to the shaft of the synchronous motor.

The slip-ring commutator device is provided with a number of commutator bars corresponding to the number of the pole pieces on the synchronous motor and has a pair of slip rings which are disposed to be excited through a transformer 6, which in turn is disposed to be connected to conductors 1, 2 and 3 by the line contactor L; or the slip rings may be energized in any other manner provided the energizing alternating current has a frequency which bears a fixed relation to the frequency of the alternating current supplied to the synchronous motor M.

A relay PR having two windings is disposed to have one winding connected to the exciter E for the purpose of polarizing the relay, and a second winding connected to the commutator bars 13 and 13' by a pair of brushes 14 and 18 having substantially the width of the commutator bars. The system of control representing my invention also embodies "forward" control relays FC and FX, a "forward" field contactor FF, "reverse" control relays RC and RX and "reverse" field contactor RF. A more complete understanding of my invention may be had from a discussion of the sequence of operation of the system of control.

To start the synchronous motor, switch 4 is actuated, thereby energizing the coil 5 of the line contactor L, whereupon the armature windings P of the synchronous motor are supplied with alternating current from the supply conductors 1, 2 and 3, and the transformer 6 is also supplied with alternating current from the supply conductors 1, 2 and 3. The transformer 6, therefore, supplies alternating current to the control circuit buses 7, 8 and 9. The frequency of this alternating current is obviously the same as the frequency supplied to the armature. Since the control buses 7 and 9 are energized, a circuit is established from the bus 9, through the resistor 10, brush 11, slip-ring 12, alternate commutator bars 13, commutator brush 14, conductor 15, actuating coil 16 of the relay PR, conductor 17, brush 18 to an alternate commutator bar 13' to the slip-ring 19, brush 20, resistor 21, conductor 22, back contact members 23 of the "forward" control relay FX, conductor 24, back contact members 25 of the "reverse" control relay RX and conductor 26 to the bus 7. Connected in parallel relation to the actuating coil 16 is an adjustable rheostat 27.

At the instant the line contactor L is closed, the armature of the motor is stationary and the commutator device being coupled to the shaft of the armature is also stationary. The current traversing the circuit above described, is, therefore, an alternating-current having a frequency equal to the frequency of the alternating-current supplied to the primary or armature windings P of the motor M. Since the actuating coil 16 of the relay PR has a much greater self-induction than the adjustable rheostat 27, it is, of course, obvious that the current traversing coil 16, when the frequency is high, is not great, and in consequence, the relay PR will not be operated, since the alternating current is shunted through the adjustable rheostat 27.

As the synchronous motor M accelerates, the voltage of the exciter E increases, thereby supplying the buses 28 and 32 with a direct-current voltage. The exciter E is provided with the conventional field winding 33 and adjustable rheostat 34. After the buses 28 and 32 are energized, the coil 29 of the relay PR also becomes energized and thus polarizes this relay. Even for quite slow speeds of the exciter, but more evidently during normal operation, the relay PR is polarized and may thus be designated a polarized relay, or a normally polarized relay. The circuit for this coil extends from the bus 28 through coil 29, resistor 30 and conductor 31 to the bus 32. The polarized relay PR will, therefore, be energized by a direct current and the armature of the relay will be biased to a given position, however, to such an extent that neither contact member 37 nor contact member 66 closes. The spring arrangement 63 biases the armature of the polarized relay and the contact members carried thereby to neutral or non-circuit-closing position.

When the synchronous motor M has attained substantially synchronous speed, the alternating current impressed upon the slip rings 12 and 19 will be substantially rectified at the brushes 14 and 18, and in consequence the current traversing coil 16 will be a current of a very low frequency, the polarized relay PR thus being in effect energized by direct current of a certain polarity. It is apparent that the low frequency alternating current or direct current traversing the coil 16 will at one part of the cycle, or at one time, act additively with reference to the effect of the coil 29 and at another part of its cycle, or at another time, will act differentially with reference to coil 29. When the effect of coils 16 and 29 is additive, the polarized relay will be operated to close either the contact members 37 or the contact members 66. However, which of these contact members close will depend upon the polarity of the exciter E and the polarity of the rectifying device C which in turn depends on the polarity of the individual poles of the synchronous motor M at any given instant.

Assuming that the action of coils 16 and 29 is such that contact members 66 are closed, a circuit is thereby established from the energized conductor 9 through contact members 66, resistor 67, actuating coil 68 of the "forward" control relay FC and conductor 69 to the energized conductor of bus 7.

The "forward" control relay FC, as well as the "reverse" control relay RC, are provided with dashpots 64 and 65, respectively, thereby delaying the operation of these relays for a short interval of time to prevent false operation of the control system, in case the low frequency alternating current through the coil 16 should tend to close contact members 66 and 37 successively. The control relays FC and RC may obviously be of any design whatsoever so long as they provide a short time constant to permit the polarized relay to firmly close one set of its contact members.

A short interval of time after the energization of coil 68, contact members 71 are closed, thereby establishing a circuit from the energized bus 28 through conductor 70, contact members 71, actuating coil 72 of the control relay FX, conductor 73, and back contact members 49 of the control relay RX to the energized bus 32. Energization of the actuating coil 72 of the control relay FX establishes a holding circuit for the coil 72 from the energized bus 28 through the conductor 74 and contact members 75. Furthermore, the operation of the control relay FX causes the opening of the contact members 43 and 23, thereby preventing the operation of control relay RX and also effecting the disconnection of the slip-ring commutator device C from the secondary windings of the transformer 6.

Operation of the control relay FX establishes a circuit from the energized bus 28 through conductor 76, contact members 77, actuating coil 78 of the "forward" field contactor FF and conductor 79 to the bus 32. The "forward" field contactor and the "reverse" field contact are each provided with back contact members 60 and 62, respectively, thereby establishing a closed circuit for the field windings F of the synchronous motor M through the discharge resistor 61. The field windings of the motor are, therefore, not subjected to excessive induced voltages during the starting period. Furthermore, the discharge circuit is not interrupted until the motor has attained substantially synchronous speed, and the field windings F are about to be excited by a direct current for normal synchronous operation. The operation of the field "forward" contactor FF connects the field windings F to the exciter E by a circuit extending from the energized bus 28 through conductor 80, contact members 81 of the "forward" contactor FF, conductor 57, ring 36, the field windings F on alternate pole pieces of the motor M to the ring 41, the field windings on the second set of alternate pole pieces to the ring 46, conductor 56, contact members 82 of the "forward" contact FF and conductor 83 to the energized bus 32.

The starting cycle is, therefore, completed and the excitation is applied to the field windings F with correct polarity, so that the armature of the motor is prevented from slipping over one pole piece when pulling into synchronism. The undesirable surges in the armature winding and supply conductors, and the hunting that frequently results because of such slippage is thereby prevented.

Should the synchronous motor come up to speed having a different polarity on its pole pieces than heretofore assumed, the polarized relay PR will obviously firmly close the contact members 37, thereby energizing the reverse control relay RC by the circuit through resistor 38, conductor 39 and actuating coil 40. The sequence of operation is, therefore, very much like the sequence of operation heretofore discussed, except in this instance, contact members 45 are closed, thereby energizing the circuit through conductor 42, contact members 43 of the "forward" control relay FX, actuating coil 44 of the "reverse" control relay RX, contact members 45 of the "reverse" control relay RX, conductor 47 and contact members 48 to the energized bus 32. With the operation of control relay RX, the circuit through conductor 50, actuating coil 51 of "reverse" field contactor RF and contact members 52 of control relay RX is energized, whereupon the "reverse" field contactor RF is caused to operate and the field windings F are connected to the exciter E by a circuit extending from the energized conductor or bus 32 through conductor 59, contact members 58 of "reverse" field contactor RF, conductor 57, the field windings of the motor M and conductor 56, contact members 55 of "reverse" field contactor RF and conductor 54 to the energized conductor or bus 28.

Obviously, the circuits maintained for the field winding F during the period of acceleration are starting connections whereas the circuits maintained after the starting sequence has been completed are the running connections.

Attention is also called to the fact that the synchronizing device is illustrated on the shaft S beyond the exciter merely for convenience in showing the circuit diagram. In actual practice the device C may be made a part of the motor M having the commutator bars 13 and 13' mounted opposite the respective pole pieces of the motor.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a control system, a source of alternating-current, an alternating-current motor having primary and secondary windings, means for connecting said primary winding to said source to accelerate said motor, an exciter for the secondary winding, means for connecting the exciter to the secondary winding, a slip-ring and commutator device disposed to operate directly proportional of the speed of said motor, and a relay having a pair of windings, one of said windings being connected to said exciter whereby the relay is polarized and the other of said windings being energized proportional to the slip of said motor through said slip-ring and commutator device, said relay controlling the means for connecting the exciter to the secondary winding when the motor has reached substantially synchronous speed.

2. In a control system for starting synchronous motors having conventional pole pieces, in combination, a motor having pole pieces and field windings thereon, a relay, means for polarizing the relay, a commutator having a bar for each pole piece, a pair of slip-rings connected respectively to alternate commutator bars, means for exciting said slip-rings by alternating-current having a frequency equal to the frequency of the current supplied to the motor, said commutator and slip-rings being mechanically connected to said motor to rotate therewith, commutator brushes and a circuit arrangement associated with said brushes for energizing said relay by a current having a frequency proportional to the slip of the motor, and means for controlling the excitation of said pole pieces by said relay.

3. In a control system for starting a synchronous motor the combination of a motor and means responsive to the percentage of slip of the motor, said means including a pair of slip-rings disposed to be energized by alternating current of a frequency equal to the frequency of the current to be supplied to the motor, a commutator having alternate bars connected to the respective rings, said slip-rings and commutator being connected to said motor to rotate therewith, and a control relay connected in circuit relation with said commutator for effecting the operation of said control system.

4. In a control system for controlling the starting sequence of an alternating-current motor, in combination, a motor having primary and secondary windings and means for energizing said windings, means responsive to the percentage of slip of the motor, said means including a mechanical rectifier mechanically coupled to the motor, means for supplying alternating-current of a frequency equal to the frequency of the current supplied to the motor to the rectifier, said rectifier being designed to rectify the current supplied thereto when the motor is substantially at synchronous speed, and means responsive to the rectified current for controlling the energization of the secondary winding.

5. A control system for starting an alternating-current motor, in combination, a motor having primary and secondary windings, a source of current, means for connecting the primary winding to said source, a synchronizing device including a pair of slip-rings disposed to be energized from said source, a commutator having alternate bars connected to the respective slip-rings, two brushes disposed to cooperate with said bars, a second source of current for said secondary winding, means for connecting the second source to the secondary winding, and a relay disposed to be connected to said brushes and responsive to predetermined characteristics of electric currents from said brushes for controlling the operation of said last-named means.

6. A control system for starting a synchronous motor, in combination, a synchronous motor having armature and field windings, a source of alternating current, means for connecting the armature winding to the source of alternating current, a source of direct current, field connecting means for connecting the field winding to the source of direct current, a synchronizing device comprising a pair of slip-rings disposed to be connected to the source of alternating current, a commutator having alternate bars connected to the respective slip-rings, brushes operatively associated with said bars, and a normally polarized relay adapted to be energized from said brushes for controlling the operation of the field connecting means, said synchronizing device being adapted to operate in synchronism with the motor.

7. In a control system for starting an alternating-current motor, in combination a motor, a synchronizing device including a polarized relay, a pair of slip-rings adapted to be energized with alternating-current having a frequency equal to the normal operating frequency of the motor, a commutator having alternate bars thereof connected to the respective slip-rings, brushes on said bars, means for connecting said polarized relay to said brushes, and mechanical couplings interconnecting said slip-rings and commutator with said motor to effect rotation thereof at a speed directly proportional to the speed of the motor.

8. A control system for starting a synchronous motor, in combination, a motor having stator and rotor or field windings, a source of alternating current, means for connecting the stator to said source, a synchronizing device mechanically coupled to said motor to rotate in synchronism with the motor, said synchronizing device including a pair of slip-rings, commutator bars alternately connected to said respective rings, means for connecting said rings to the source of alternating-current, commutator brushes cooperating with said bars, a source of direct current, a normally polarized relay having a pair of coils, one of said coils being connected to said source of direct current to polarize the relay and the second of said coils being connected to said brushes whereby said relay is caused to operate when the frequency of the current in the second coil has decreased to a low value relative to the frequency of the current supplied to the motor, and means controlled by said relay for connecting said field windings to the source of direct current.

9. A system of control for controlling the starting operation of a synchronous motor, in combination, a motor having an armature winding and a field winding, a source of alternating current, a line contactor for connecting the armature winding to said source, said field winding being distributed over a number of poles, a commutator mounted to rotate with said armature and having as many bars as there are poles, brushes for said commutator, a pair of slip-rings, alternate bars of said commutator being mechanically and electrically connected to the respective slip-rings, means for connecting said source of supply to the slip-rings, a source of direct current, field contactors for connecting the field windings to the source of direct current, a control contactor adapted to effect the operation of the field contactors, time-limit relays controlling the operation of the control contactors, and a balanced normally polarized relay for selectively controlling the operation of the time-limit contactors, said polarized relay having a polarizing coil connected to the source of direct current and an actuating coil connected to said brushes.

10. A system of control for controlling the starting operation of a synchronous dynamo-electric machine, in combination, a dynamo-electric machine having an armature winding and a field winding, a source of alternating current, a line switch for connecting the armature winding to said source to accelerate the rotor of said synchronous dynamo-electric machine to synchronous speed, said field winding being distributed over a number of poles, a commutator mounted to rotate with said armature and having bars the number of which is an even multiple of the number of poles, a pair of slip-rings, alternate bars of said commutator being mechanically and electrically connected to the respective slip-rings, means for connecting said source of supply to the slip-rings, a source of direct current, field switches for connecting the field winding to the source of direct current in either one of two ways, control contactors adapted to effect the operation of the field switches, time-limit relays controlling the operation of the control contactors, a balanced relay capable of operation in two directions, said relay having a polarizing coil connected to the source of direct current and an actuating coil connected to two brushes disposed to bear on the said commutator, said relay being adapted to control the operation of said time-limit contactors and indirectly said field switches so that said field winding will be connected to said source of direct current in a manner to produce in said field winding a magnetic field of the same polarity as that induced in said field winding by the action of said armature winding.

11. In a control system for starting an alternating current dynamo electric machine having a primary winding and a secondary winding, the combination of said machine with, a source of alternating current for the machine having a certain frequency and with means responsive to the percent slip of the machine, said means including a pair of sliprings disposed to be energized from said source of alternating current having a certain frequency, a commutator having alternate bars connected to the respective sliprings, said sliprings and commutator being mechanically coupled to said machine to rotate therewith, and a control relay adapted to be connected in circuit relation with said commutator for controlling the starting of said machine through said control system.

JESSE P. SKILLEN.